United States Patent [19]
Boyum

[11] 3,803,749
[45] Apr. 16, 1974

[54] SINKER DEVICE

[76] Inventor: Norman B. Boyum, Battle Lake, Minn.

[22] Filed: Sept. 13, 1972

[21] Appl. No.: 288,745

Related U.S. Application Data

[63] Continuation-in-part of Ser. No. 120,182, March 2, 1971, abandoned.

[52] U.S. Cl. .................................................. 43/44.9
[51] Int. Cl. ............................................ A01k 95/00
[58] Field of Search ..................................... 43/44.9

[56] References Cited
UNITED STATES PATENTS
3,096,599  7/1963  Baron ................................. 43/44.9
3,273,278  9/1966  Lynch ............................. 43/44.9 X FOREIGN PATENTS OR APPLICATIONS
480,461  5/1916  France ................................. 43/44.9
17,494  0/1891  Great Britain ....................... 43/44.9

Primary Examiner—Antonio F. Guida
Assistant Examiner—Daniel J. Leach
Attorney, Agent, or Firm—Robert E. Kleve

[57] ABSTRACT

The invention comprises a sliding sinker device. The sliding sinker has a cylindrical plastic tube which is mounted to the fishing line with a center bore sufficiently large enough for the tube to slide freely on the fishing line. A plurality of detachable weights each has a center bore with a longitudinal slot into the weights to the bore for sliding the fishing line into the center bore of the weight, whereupon the tube may be slid into the bore of the weight to operatively attach the sliding sinker to the fishing line.

2 Claims, 15 Drawing Figures

PATENTED APR 16 1974          3,803,749

INVENTOR
NORMAN B. BOYUM

BY Robert E. Kleve

ATTORNEY

PATENTED APR 16 1974  3,803,749
SHEET 2 OF 2

SINKER DEVICE

This application is a continuation-in-part of my earlier copending application Ser. No. 120,182, filed Mar. 2, 1971, now abandoned.

This invention relates to fishing equipment, more particularly, the invention relates to sliding sinkers.

It is the object of the invention to provide a novel sliding sinker device which may be attached to a fishing line in a manner that the weight of the sinker device may be exchanged for a different size weight without having to cut the line.

It is a further object of the invention to provide a novel sliding sinker device wherein one size weight may be detached and another size weight attached easily and rapidly.

Further objects and advantages of the invention will become apparent as the description proceeds and when taken in conjunction with the accompanying drawings wherein.

Briefly stated the invention comprises a sliding sinker having a plastic tube slidably mounted on a fishing line, a weight having a center bore slightly smaller than the outside diameter of the plastic tube so as to frictionally retain the tube in the base of the weight, said weight having a longitudinal slot whereby the fishing line may be inserted laterally of its length into the bore of the weight at a location in front of the tube and the tube may thereon be slid along the fishing line and be inserted into the bore of the weight to frictionally lock the weight onto the tube. The tube has a bore slightly larger than the outside diameter of the fishing line, whereby the sinker invention may slide freely along the fishing line and serve as a sliding sinker.

Figure 1:
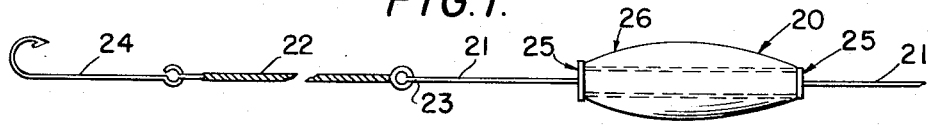
FIG. 1 is a side elevational view of the sliding sinker device shown operatively attached to the fishing line.

Referring more particularly to the drawing, in FIG. 1, the sliding sinker invention 20 is shown operatively mounted to a fishing line 21 with a leader 22 attached to the end 23 of the fishing line and a hook 24 attached to the end of the leader.

Figure 6:
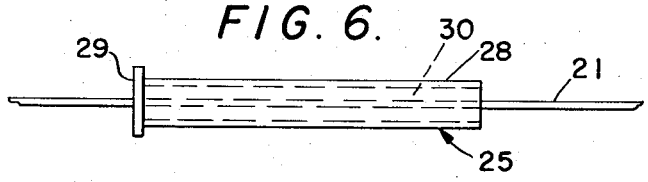
FIG. 6 is a side elevational view of the receiving tube.

The sliding sinker invention 20 has a plastic tube member 25 and a weight member 26 shown in FIGS. 1–4, inclusive, a different weight member 27 of a different size and weight, shown in FIG. 6, also provided with the invention.

The plastic tube member 25 is resilient and has an elongated cylindrical portion 28 and an enlarged head 29 at one end. A bore 30 extends through the longitudinal center of the cylindrical portion 28 and head 29 of the plastic tube 25.

The weight member 26 is made of lead and has a longitudinal slot 31 which communicates with a center bore 32 in the weight member 26. Similarly, weight member 27 is also made of lead and has a longitudinal slot 31 which communicates with a center bore 32 in weight member 27.

The bores 31 of the weight members 26 and 27 are slightly smaller than the outside diameter of the cylindrical portion 28 of the plastic tube so that when the plastic tube 25 is inserted into the bore 31 of either weight 26 or 27, the tube 25 will be frictionally retained in the bore of the weight. Weight 27 is smaller and weighs less than weight 26.

Figure 2:
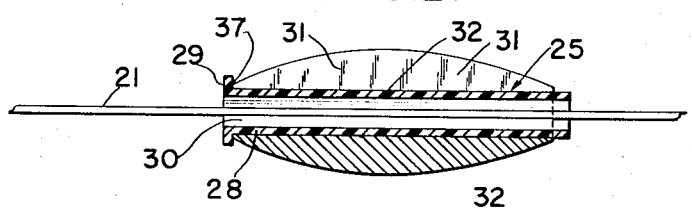
FIG. 2 is a cut away view of the sliding sinker invention.
Figure 3:
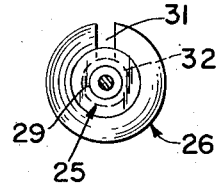
FIG. 3 is an end view of the sliding sinker invention of FIG. 1.
Figure 4:
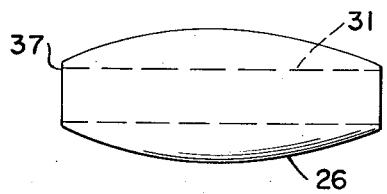
FIG. 4 is a side elevational view of the sliding sinker weight.
Figure 5:
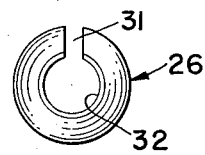
FIG. 5 is an end view of the sliding sinker weight of FIG. 4.

The sliding sinker invention operates as follows:

The plastic tube 25 will be attached to the fishing line 21, as shown in FIG. 2, and will remain on the line throughout the fishing operation and while exchanging weight member 26 with weight member 27 visa versa, or with other weights of the same construction only having a different weight or shape to them.

Figure 7:
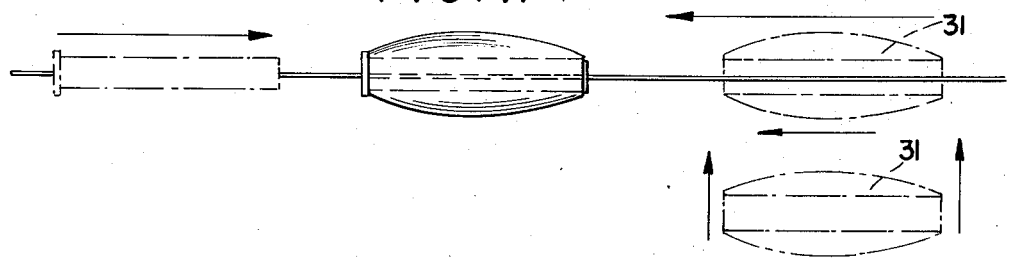
FIG. 7 is a side elevational view of the sliding sinker invention with the tube shown operatively attached to the fishing line and with a step by step showing in phantom lines of the mounting of the weight of the sliding sinker to the line and the insertion of the tube into the weight for operative use of the sliding sinker.
Figure 8:
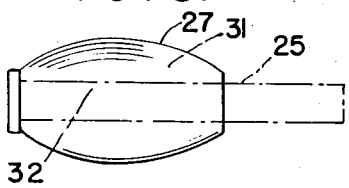
FIG. 8 is a side elevational view of a second size weight with the receiving tube shown inserted into the weight in phantom lines.
Figure 9:
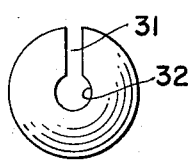
FIG. 9 is an end view of the second size weight of FIG. 8.

Assuming that the fisherman wishes to use weight 26, he will attach weight 26 to the fishing line 21 by inserting the fishing line 21 into the slot 31 until the fishing line 21 rest in the center bore 32 of the weight 26. Whereupon, the fisherman will slide the tube into the bore of the weight from its position shown in phantom lines in FIG. 7 to its position shown in solid lines with the tube sliding into the base of the weight, and with the fishing line in the bore of the tube, until the enlarged head 29 of the tube 25 abuts the end 37 of the weight 26. The tube 25 will be frictionally retained in the bore of the weight until manually removed by the fisherman.

The hook, leader, fishing line, and sliding sinker invention may now be employed for fishing, with the hook, leader, line, and sinker positioned and suspended vertically in the water from a fishing pole with the hook at the lowermost end. The sliding sinker will operate in a conventional manner to provide a weight to the line to bring it near or to the bottom, and with the sliding sinker invention 20 sliding freely along the fishing line. When a fish grasps the hook, reaction to the sudden pull as the fish strikes causes the sinker to slide along the fishing line decreasing the drag.

If the fisherman wishes to change from weight 26 to a different size weight such as weight 27 while fishing, he will merely slide the plastic tube 25 out of the weight member 26, and slide the weight member 26 off the line 21 through the slot 31. The new weight 27 will be attached in the same manner as weight 26 by inserting the line 21 laterally of its length into the slot 31 until the fishing line 21 is in the center bore 32 of the weight 27, whereupon the tube and weight will be slid together, or the tube will be slid into the bore of the weight and frictionally retained therein, which thereby completes the operation of exchanging weights.

The tube 25 will be tapered slightly from its inner end to its outer end so that it forms a slightly frusto conical configuration with the diameter of the outer end 25' being smaller than the diameter of the inner end 25" to facilitate the introduction of the tube 25 into the bore of the weight 26 and to create a wedging frictional engagement of the tube 25 with the bore 32.

The weights of the sinker invention may be of different sizes and shapes than as illustrated.

Thus it will be seen that a novel sliding sinker invention has been provided wherein the weights may be easily and rapidly exchanged without having to cut the fishing line.

Figure 10:
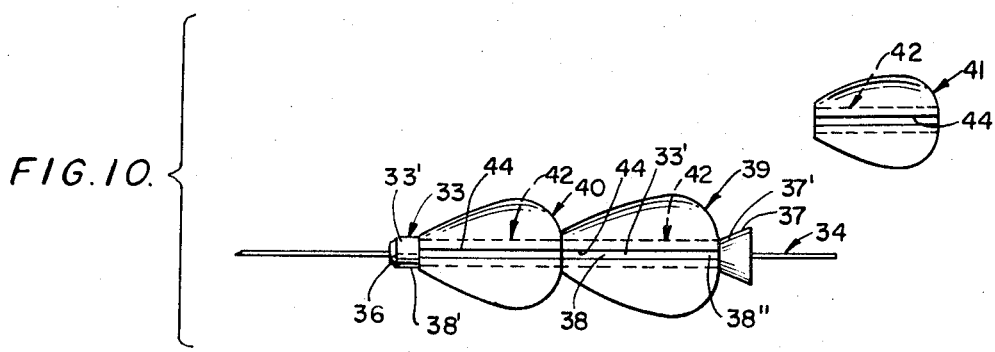
FIG. 10 is a side elevational view of the modified form of sinker invention illustrating the plastic tube with two weights attached thereto and one weight positioned adjacent.
Figure 11:
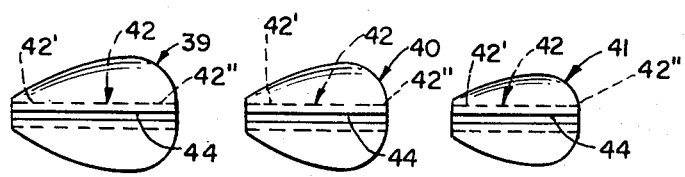
FIG. 11 is a side elevational view of the different size weights of the modified sliding sinker invention.
Figure 12:
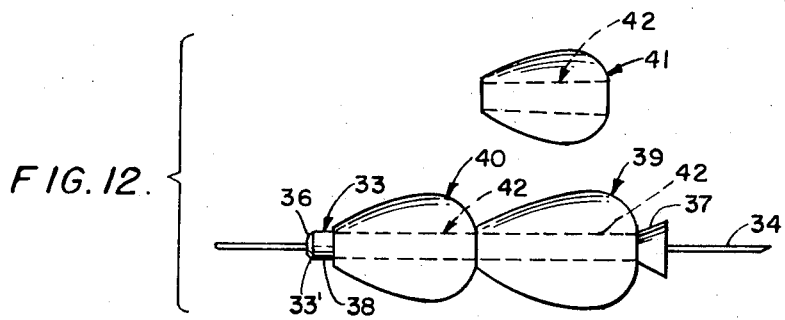
FIG. 12 is a top plan view of the modified form of sliding sinker invention illustrating the plastic tube with two weights attached thereto and one weight adjacent.

The subject matter being added by this continuation-in-part application is set forth in FIGS. 10–14, inclusive, and is described as follows:

In FIG. 10, the modified sinker invention has the plastic tube 33. The plastic tube 33 has a hollow cylindrical portion 33' and is shown with a fishing line 34 passing freely through the hollow cylindrical interior 35 of the cylindrical portion 33' of the tube. The cylindrical portion 33' of the plastic tube 33 has a tapered forward edge nose end 36 and a outwardly flared tapered annular flange 37 at its other end. The annular flange 37 has tapered diverging outer surfaces 37' and tapered converging inner surfaces 37".

The plastic tube 33 will have a certain amount of resiliency and will have a straight cylindrical outer surface, with the same outside diameter at one end 38' as at the other end 38". The cone like weights 39, 40, and 41 are made of lead. The weights 39, 40, and 41 weigh one-half ounce, three-eighths ounce and one-fourth ounce, respectively. The cone like weights 39, 40, and 41, each has a rectangular passageway 42. The passageway 42 in each weight has four rectangular sides 43 with its one end 42' slightly smaller than its other end 42" so as to form a slightly tapered bore and passageway from one end to another. The smaller end 42' will be slightly smaller than the outside diameter of the cylindrical portion 33' of the plastic tube. Consequently, when any of the weights 39, 40, or 41 are slid onto the plastic tube 33, there is an immediate frictional engagement as soon as the smaller end 42' of the weight slides a little way onto the cylindrical portions 33' of the tube or sleeve 33. There will be continuous wedging, frictional engagement between the smaller end 42' of each weight and the outer cylindrical surfaces 38 of the cylindrical portion 33' of the tube, as each weight is slid along the outer cylindrical surfaces toward the flange 37. This wedging, frictional engagement acts to frictionally retain the weight at any location on the cylindrical portion 33' of the tube, once the smaller end 42' engages the surfaces of the cylindrical portions 33' of the tube, by the smaller end 42' slightly compressing into the cylindrical surfaces.

Figures 13, 14:
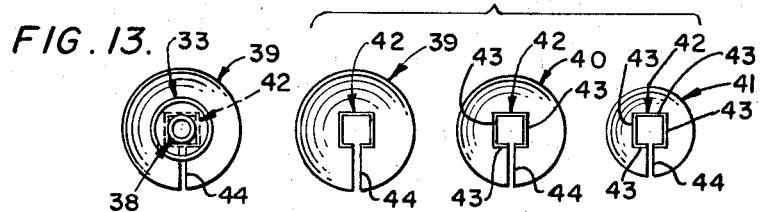
FIG. 13 is an end view of the plastic tube with one weight attached thereto.
FIG. 14 is an end view of the three different size weights.
Figure 15:
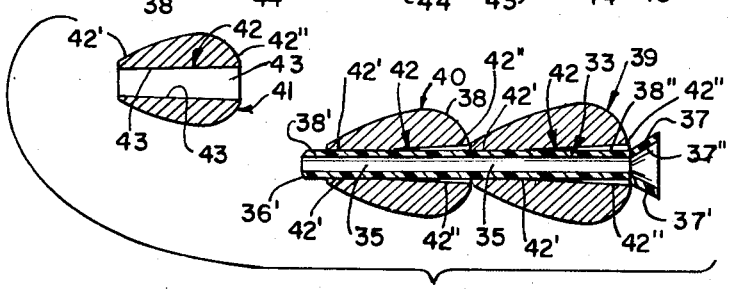
FIG. 15 is a cutaway side elevational view of the sliding sinker invention with two weights frictionally attached to the plastic tube and one weight adjacent thereto and with the weights and plastic tube cut away to reveal the interior tapered passageway in each weight and their frictionally engagement with the straight cylindrical surfaces of the tube.

The plastic tube 33 is sufficiently long from its one end 38' to its other end 38" to frictionally retain and accommodate any two of the three weights 39, 40, or 41, as illustrated in FIGS. 10 and 14. Also, as an alternative, the plastic tube is sufficiently long enough from its one end 38' to its other end 38" to similarly frictionally retain and accommodate two ½ ounce weights 39, or two ⅜ ounce weights 40, or two ¼ ounce weights.

Each weight 39, 40, and 41 has a radial slot 44 which communicates into the hollow rectangular interior or passageway 42 so that the weight may be attached to the line 34 by sliding the line 34 through the slot 44 into the hollow interior and thereafter sliding weight or weights onto the tube portion 33' from the tapered forward edge 36 toward the tapered annular flange 37.

Since each weight 39, 40, and 41 has an inside individual tapered passageway 42 of the same dimension with one another, as illustrated in FIG. 14, and since the tube portion 33' has a straight outer cylindrical surface, the tube portion 33' will frictionally retain any two weights on the tube. The weight may also be compressed slightly by hand to further frictionally retain the weights and/or weight on the tube.

The tapered edge 36 at the forward end of the tube facilitates sliding the weight onto the tube and the tapered projecting flange 37 at the other end facilitates the operator grabbing the flange 37 with the fingers of one hand and the weight on the tube with the fingers of the other hand to slide the weight or weights off the tube.

Also, larger weights such as one, two, or three ounce weights may be provided which will have the same inside radial dimension in its center passageway as the passageway in weights 39, 40, and 41 at its one end 42' and its other end 42" to wedge or frictionally retain the larger weights on the tube in the same manner as the smaller tapered end 42" as the smaller weight 39, 40, and 41, and the larger weights will have the same radial slot 44 as the weights 39, 40, and 41.

A fish hook will be attached to the one end of the fishing line 34 and the line 34 will be suspended vertically with the tapered flange 37 of the sinker at the lower end and with the tube 33 free to slide along the line 34 with the weight or weights thereon in the same manner as described in the first form of the invention.

Thus, it will be seen that a novel sliding sinker has been provided to rapidly interchange weights on the fishing line by attaching any one of the weights 39, 40, or 41 on the tube, or by placing any two of these weights on the tube, or by attaching any two weights, such as two weights 39 or two weights 40 or two weights 41 to thereby provide a wide variety of weight combinations.

It will be obvious that various changes and departures may be made to the invention without departing from the spirit thereof, and accordingly it is not intended that the invention be limited to that specifically described in the specification or as illustrated in the drawing, but only as set forth in the appended claims.

What is claimed is:

1. A sliding sinker device for fishing comprising an elongated resilient tube in combination with a fishing line and a plurality of lead weights of different sizes, said resilient tube having a central passageway along its length for freely receiving said fishing line therein, each of said lead weights having a central passageway therethrough with a radial slot from the exterior of the weight to the central passageway of the weight to provide communication with the central passageways of the weights, said elongated tube being adapted to to of sufficient length to receive at least two of said lead weights fully thereon, said elongated tube having a straight cylindrical outer surface with an enlarged annular flange at one end, said lead weights each having tapered inner surfaces along their central passageway to form a smaller end in the passageway directed toward one end of the weight and a larger end in the passageway directed toward the other end of the weight, said lead weights being attachable to said line by inserting the fishing line laterally through the slots into the central passageways of the weights, each of said lead weights thereafter being attached to said tube by being slidably attached on the tube in a detachable manner with the larger passageway end of the lead weight closest to the enlarged flange and with the smaller passageway end of the lead weight furthest from the enlarged flange of the tube, said larger passageway end of each weight being slightly larger than the outside diameter of the tube, said smaller passageway end of each weight being slightly smaller than the outside diameter of the tube whereby the smaller end acts to frictionally retain the weights independently on the tube by individually and continuously wedging down against the tube in a direction away from the enlarged flange.

2. A sliding sinker device according to claim 1 wherein said annular flange has tapered outwardly diverging outer surfaces diverging outward along generally a straight line, said flange having inside surfaces tapering and diverging outward from the passageway of the tube.

* * * * *